Aug. 5, 1969   O. RUBISCH   3,459,583
BODY OF INDUSTRIAL CARBON WITH AN OXIDATION INHIBITING
COATING, AND METHOD OF PRODUCING SUCH BODIES
Filed Jan. 9, 1967
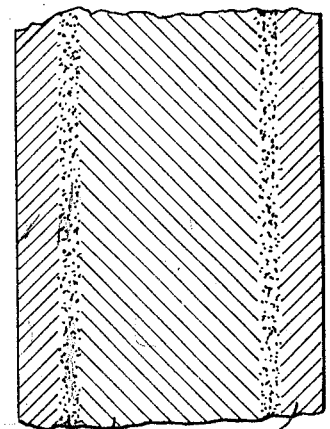
Fe-Si-C   Carbon   Silicide United States Patent Office 3,459,583
Patented Aug. 5, 1969

3,459,583
BODY OF INDUSTRIAL CARBON WITH AN OXIDATION INHIBITING COATING, AND METHOD OF PRODUCING SUCH BODIES
Ottmar Rubisch, Meitingen uber Augsburg, Germany, assignor to Sigri Elektrographit G.m.b.H., Meitingen uber Augsburg, Germany, a corporation of Germany
Filed Jan. 9, 1967, Ser. No. 608,093
Claims priority, application Germany, Jan. 11, 1966, S 101,382
Int. Cl. B05b 7/20; B44d 1/14, 1/18
U.S. Cl. 117—70                                     11 Claims

ABSTRACT OF THE DISCLOSURE

A body of artificial graphite or other industrial carbon is coated with an oxidation inhibiting metal silicide material consisting substantially of 5 to 45% by weight of iron, 55 to 94.9% of silicon and 0.1 to 10% of one or more of Na, K, Mg, Ca, B, Al, Ti, Zr, Mn, P, O. The coating is produced by flame-spraying the pulverulent material onto the carbon body or immersing the body in a melt of the coating material. An intermediate bonding layer of Fe-Si-C is produced by heating the coated body to 1000–1400° C.

---

My invention relates to bodies of synthetic graphite or other industrial carbon with an oxidation inhibiting or retarding coating substantially of metal silicide, and to a method of producing such a protective coating.

Due to their great mechanical strength at high temperatures and their good stability under the effect of temperature changes, industrial carbons and bodies of graphite excel as high-temperature materials for industrial purposes. Such bodies, however, do not readily lend themselves to operation at temperatures above 500° C. in an oxidizing atmosphere, because the carbon material then increasingly oxidizes with increasing temperature. Several means have become known for reducing such burn-off. It is known particularly to coat the carbon bodies with carbides or silicides of transition metals from the fourth to the sixth group of the Periodic System.

It is an object of my invention to devise an oxidation inhibiting or retarding metal silicide coating which can be produced on bodies of graphite or other industrial carbon in a simpler manner than the high-melting protective layers of the above-mentioned transition metals and which nevertheless secures sufficient burn-off protection.

To this end, and in accordance with my invention, I coat the carbon surface of the body with a material consisting of 5 to 45% by weight of iron, 55 to 94.9% of silicon, the remainder of 0.1 to 10% consisting of one or several of the elements Na, K, Mg, Ca, B, Al, Ti, Zr, Mn, P, O.

According to a preferred feature of my invention, the protective coating on the body of industrial carbon is composed of 10 to 34% iron, 65 to 90% silicon and 1 to 8% of the above-mentioned remainder.

Such a protective coating can be deposited upon the carbon body in a simple manner by flame-spraying the pulverulent composition, or by immersing the carbon body in a melt of the composition material. Although a protective layer thus deposited upon the carbon surface is virtually anchored to the carbon body in a mechanical sense only, it nevertheless has good electrical conductivity. The porosity of the coating is 1 to 10% by volume, depending upon the type of deposition process employed.

For also obtaining a chemical anchoring or bonding of the protective coating to graphite or other industrial carbon, it is preferable to subject the coated body to a heat treatment at 1000 to 1400° C. This causes the formation of an Fe-Si-C layer between the silicide coating and the carbon body. Such heating can be performed in the presence of atmospheric oxygen, in which case the surface of the coating will oxidize and convert to a coherent vitreous surface layer of brown color, consisting of approximately 70 to 85% $SiO_2$, the remainder being FeO and other vitrifying substances. Consequently, the coating, originally deposited in form of a single layer and subjected to the oxidizing treatment just described, is ultimately composed of three differently constituted layers which remain firmly adherent to the carbon body when the body is subjected to alternating temperature stresses. When the protective layer is deposited upon the body of carbon by immersing the body in the molten coating material, the above-mentioned intermediate layer of Fe-Si-C is formed immediately between the carbon body and the silicide protective coating so that no additional heating step is required.

The drawing shows schematically a portion of a silicide-coated carbon body according to the invention.

The melting temperature of the coating material employed according to the invention is between 1000 and 1300° C. This relatively low melting point has been found particularly desirable in comparison with the previously known oxidation inhibiting silicide protective coatings of metal silicide, in addition to the advantage of applying the coating simply by flame-spraying of pulverulent material or immersing the carbon body in the molten alloy. Essential advantages further are the low cost of the alloy or composition, as well as the fact that the protective layer vitrifies automatically at increased temperature, and that the protective coating according to the invention also provides for protection from oxidation at temperatures between 600 and 1400° C.

The application of the invention to graphite electrodes has been found to afford particularly outstanding advantages. Protective coatings on graphite electrodes must be electrically good conducting in order to secure a satisfactory supply of electric current under operating conditions that may result in temperatures between 300 and 500° C. at the contact locations. Hence the protective coating must not appreciably oxidize in this temperature range. On the other hand, the coating must become progressively high-melting and more oxidic as it more and more approaches the locality of the electric arc, so that the coating will withstand the correspondingly increasing temperature as well as the attack by slag and squirted iron drops. By virtue of the above-described multi-layer formation, all of these requirements are met by coated graphite structures according to the invention.

The following examples will further elucidate the deposition process and the effect of protective coatings according to the invention.

EXAMPLE 1

An electric heating rod of graphite having a diameter of 50 mm. and a length of 1500 mm. is clamped at both ends into a jig and is then kept rotating about its longitudinal axis with the aid of a motor at a slow speed of 10 revolutions per minute. Simultaneously an alloy powder sprayed onto the rod with the aid of a flame-spray gun operating with acetylene and oxygen. The alloy powder is composed of 80% Si+15% Fe+3% Al+1.5% Ca+0.5% Na. The grain size of the powder is 60 to 120μ. The material is uniformly deposited upon the rotating graphite rod until a layer thickness of 0.1 mm. is attained. Thereafter the body is removed from the jig and the previously clamped ends are coated in the same manner by flame spraying.

The graphite rods thus treated attain somewhat more than twice the length of useful life when operating at a surface temperature at 1500° C., in comparison with the same but untreated rods.

EXAMPLE 2

Graphite crucibles having an outer diameter of 100 mm. and a height of 100 mm. are coated on all sides with a silicon alloy as follows: The graphite workpieces are suspended from hooks of silicon carbide and thus immersed into a molten bath of an alloy composed of 70% Si+10% Fe+10% Mn+4% Zr+3.5% Al+1% B+0.5% Ca+1.0% O. The molten alloy is kept in a trough-type furnace at a temperature of 1350° C. After a dwell time of 5 minutes in the melt, the now uniformly coated crucibles are withdrawn and cooled in ambient air down to room temperature. During cooling, a very thin glass-like outer layer is formed. Such crucibles, in comparison with the same but untreated workpieces, exhibit approximately a four times greater length of useful life when operated at 1200° C. in air.

I claim:

1. A body of industrial carbon with an oxidation inhibiting coating of metal silicide material, said coating being formed of 5 to 45% by weight of iron, 55 to 94.9% of silicon and 0.1 to 10% remainder consisting substantially of at least one of the elements Na, K, Mg, Ca, B, Al, Ti, Zr, Mn, P and O.

2. A carbon body according to claim 1, comprising a layer of Fe-Si-C located intermediate the carbon body and said coating and bonding said coating to said body.

3. A carbon body according to claim 1, wherein said silicide coating is formed of 10 to 34% by weight of iron, 65 to 90% of silicon and 1 to 8% of said remainder.

4. A carbon body according to claim 1, wherein said silicide coating is formed of 10 to 34% by weight of iron, 65 to 90% of silicon and 1 to 8% of said remainder, and a layer of Fe-Si-C located intermediate the carbon body and said coating and bonding said coating to said body.

5. A carbon body according to claim 1, comprising a vitreous surface layer on top of said silicide coating.

6. A carbon body according to claim 1, comprising a surface layer on top of said silicide coating, said surface layer being formed substantially of silicon dioxide, iron oxide and other vitrifying substance.

7. The method of producing a coated carbon body according to claim 1, which comprises coating the carbon surface of the body with a mixture of 5 to 45% by weight of iron, 55 to 94.9% of silicon and 0.1 to 10% remainder consisting substantially of at least one of the elements Na, K, Mg, Ca, B, Al, Ti, Zr, Mn, P and O, and heating the mixture to iron-silicide-forming temperature.

8. The method of producing a coated carbon body according to claim 1, which comprises flame-spraying upon the carbon surface of the body a pulverulent mixture of 5 to 45% by weight of iron, 55 to 94.9% of silicon and 0.1 to 10% remainder consisting substantially of at least one of the elements Na, K, Mg, Ca, B, Al, Ti, Zr, Mn, P and O.

9. The method of producing a coated carbon body according to claim 1, which comprises melting a mixture of 5 to 45% by weight of iron, 55 to 94.9% of silicon and 0.1 to 10% remainder consisting substantially of at least one of the elements Na, K, Mg, Ca, B, Al, Ti, Zr, Mn, P and O, and immersing the carbon body in the melt to thereby form a coating on the carbon surface of the body.

10. The method according to claim 7, which comprises heating the coated body to between 1000° and 1400° C., whereby an Fe-Si-C intermediate bonding layer is produced.

11. The method according to claim 10, wherein the heating of the coated body is effected in an oxidizing atmosphere.

References Cited

UNITED STATES PATENTS

| | | | |
|---|---|---|---|
| 869,013 | 10/1907 | McOuat et al. | 117—228 X |
| 1,948,382 | 2/1934 | Johnson. | |
| 2,866,725 | 12/1958 | Alexander | 117—228 |
| 2,925,357 | 2/1960 | Kothen | 117—169 X |
| 3,019,128 | 1/1962 | Smiley | 117—228 X |
| 3,264,135 | 8/1966 | Wakelyn et al. | 117—69 |
| 3,348,929 | 10/1967 | Valtschev et al. | 117—228 X |
| 3,390,013 | 6/1968 | Rubisch. | |
| 3,393,084 | 7/1968 | Hartwig | 117—69 X |

ALFRED L. LEAVITT, Primary Examiner

J. R. BATTEN, Jr., Assistant Examiner

U.S. Cl. X.R.

117—69, 105, 113, 118, 169, 215, 228